No. 634,058. Patented Oct. 3, 1899.
W. H. FAUBER.
SEAT POST CLAMP.
(Application filed May 22, 1897.)
(No Model.)
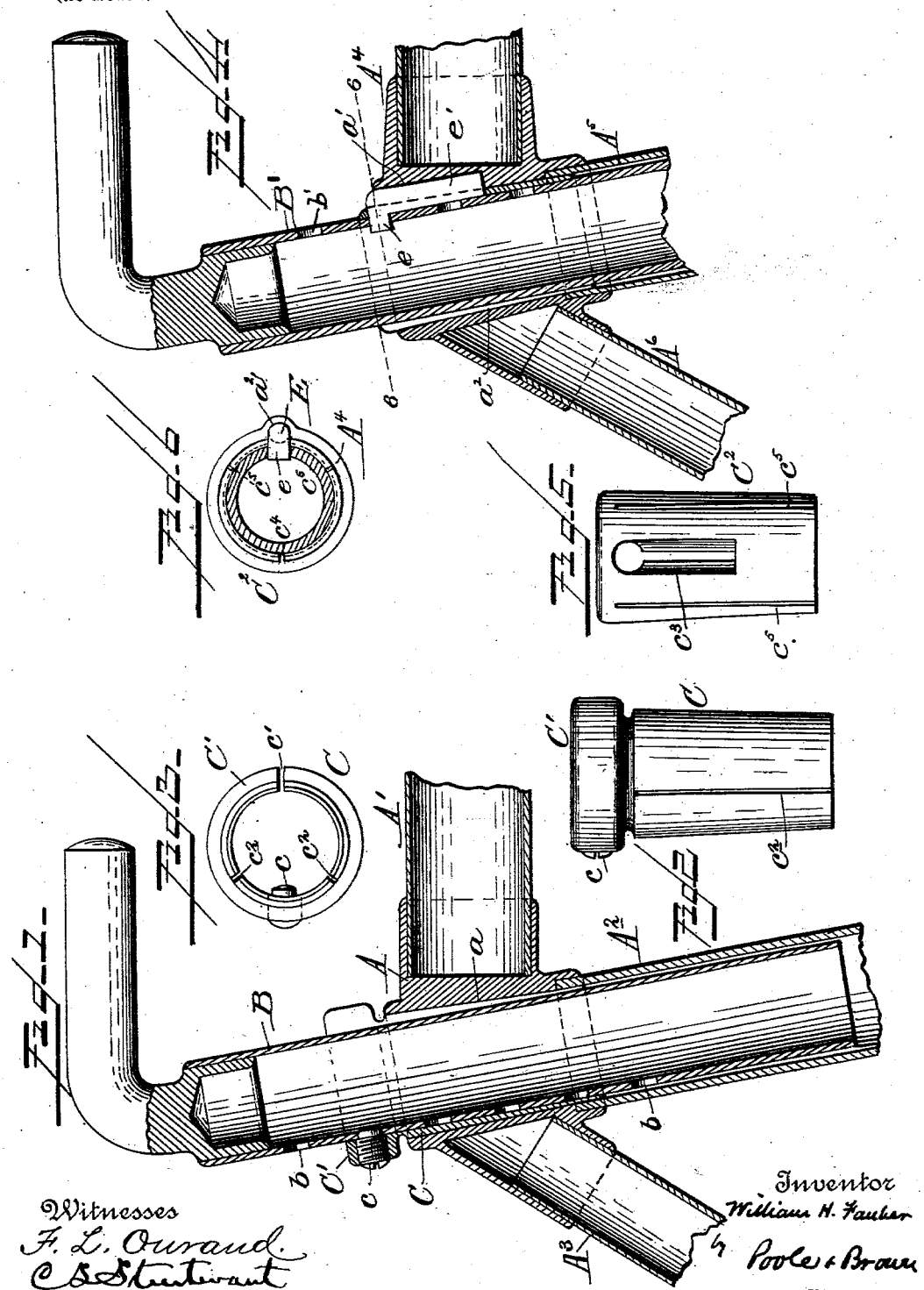
Witnesses
F. L. Ourand.
C. S. Sturtevant
Inventor
William H. Fauber
by Poole & Brown
Attorneys

UNITED STATES PATENT OFFICE.

WILLIAM H. FAUBER, OF CHICAGO, ILLINOIS.

SEAT-POST CLAMP.

SPECIFICATION forming part of Letters Patent No. 634,058, dated October 3, 1899.

Application filed May 22, 1897. Serial No. 637,665. (No model.)

*To all whom it may concern:*

Be it known that I, WILLIAM H. FAUBER, of Chicago, in the county of Cook and State of Illinois, have invented certain new and useful Improvements in Seat-Post Clamps; and I do hereby declare that the following is a full, clear, and exact description thereof, reference being had to the accompanying drawings, and to the letters of reference marked thereon, which form a part of this specification.

This invention relates to an improved seat-post clamp for velocipedes and the like; and it consists in the matters hereinafter described, and pointed out in the appended claims.

In the accompanying drawings, illustrating my invention, Figure 1 is a view in central vertical section of the seat-post fitting and seat-post, together with a clamping device embodying my invention. Fig. 2 is a view in side elevation of the tapered split sleeve forming part of the device. Fig. 3 is an end view of the same as seen from the lower end. Fig. 4 is a view, similar to Fig. 1, of another form of clamp embodying my invention. Fig. 5 is a side view of the form of tapered split sleeve shown in said Fig. 4. Fig. 6 is a sectional view taken on line 6 6 of Fig. 4.

As shown in said drawings, Figs. 1, 2, and 3, A indicates the seat-post fitting, A' and A² the upper tubular frame member and seat-post frame member, and A³ one of the rear-fork members. Said seat-post fitting is provided with a tapered bore or socket $a$, of greater diameter at its upper than at its lower end. Preferably the seat-post frame member A² terminates in the lower part of the fitting A, and the body portion of the fitting consists of a closed or continuous tube without openings where the thimbles for attachment of the frame-pieces A' and A³ join the same, so that the bore $a$ is smooth and continuous.

B indicates the seat-post, which has a cylindric outer surface, and which is, as herein shown, tubular in construction.

C indicates a tapered split sleeve which surrounds the seat-post and enters the tapered bore or socket $a$, the outer surface of the said sleeve being tapered to correspond with the taper of the socket. Said sleeve C is movable endwise on the seat-post and is adjustably secured thereto by locking means adapted to positively lock or hold the sleeve from vertical movement on the post. The locking or holding means herein shown for this purpose consists of a plurality of holes $b\ b$ in the post and a holding-stud $c$ in the sleeve. The sleeve is split lengthwise in such manner as to allow the expansion and contraction of its part which enters between the seat-post and the seat-post fitting. As shown in said Figs. 1, 2, and 3, the said sleeve is tapered in its lower portion and at its upper end is provided with a thickened part or flange C', in which the holding-stud $c$ is secured. Said stud in this instance is a screw-stud having screw-threaded engagement with an aperture in the flange C' and having a cylindric projection at its inner end adapted to engage one of the holes $b$ in the seat-post. The sleeve thus made with a flange C' is split throughout its entire length and through the flange at one point (indicated by $c'$) and split through its tapered portion and up to the flange C' at two other places, as indicated by the slots $c^2 c^2$. By so splitting the sleeve the tapered parts of the same which enter between the fitting and seat-post are elastic and are adapted to yield or spring in such manner as to adjust themselves perfectly to the adjacent parts, so that when the sleeve is secured to the seat-post and the latter is then thrust downwardly through the fitting, so as to force the tapered sleeve into the tapered socket of the fitting, the split parts of the sleeve will press equally with a wedge action on both the post and the fitting. The taper of the sleeve and its socket is such that the sleeve and post to which it is locked will be held frictionally against movement under ordinary pressure or strains, the contact-surfaces being of course accurately fitted to each other. A rigid connection of the post with the fitting by the clamping of the wedge-shaped sleeve in its socket is of course promoted by the weight of the rider, which tends to force the sleeve farther into the socket.

The operation of the device is obvious, the post being secured in place by merely forcing the sleeve in the socket by downward pressure on the post, and being loosened or detached by pulling upwardly or outwardly upon the post. The height of the saddle will be adjusted by shifting the sleeve upon the post, this being accomplished by loosening the holding-stud $c$ and sliding the sleeve along the post until the holding-stud can be inserted in one of the holes of the post above or below the one in which it was previously located, as necessary to bring the saddle to the desired position.

In the construction shown in Figs. 4, 5, and 6 the parts are made in the same manner as before described, with the following exceptions: The sleeve $C^2$ is in this instance without any flange or collar at its upper end, but is split in the same manner as the one before described, slits $C^4$ extending through the full length of one of the sleeves, while two others, $C^5 C^5$, reach to points short of the upper edge of the sleeve. A holding-piece E is provided in this instance, the same consisting of a cylindric wire or piece of metal bent into L form to form a holding projection $e$ and a shank $E'$. The shank part is fitted in a longitudinal slot $c^3$, Fig. 5, formed in the sleeve $C^2$ below the upper end of the same, the parts being so constructed that when the shank is inserted in the slot its holding projection $e$ extends through one of the holes $b'$ of the seat-post $B'$. The slot $c^3$ is made of the same length as the holding-piece E, so that the latter engages at both its ends with the ends of the slot. This construction insures the rigid locking of the sleeve on the post when the piece E is engaged with the sleeve and post. Said shank $e'$ extends outwardly beyond the outer face of the sleeve and fits within a vertical groove or socket $a'$, formed in the adjacent inner face of the fitting $A^4$. Said locking-piece E thus constructed serves not only to hold the sleeve from endwise movement on the post, but by its engagement with the socket $a^2$ prevents the post and sleeve from turning or rotating in the said socket. The removal and adjustment of the seat-post may be accomplished in this latter construction in the same way as in the first-described, it being obvious that the seat-post may be removed from the fitting by pulling upwardly thereon and that the shifting of the sleeve may be easily accomplished by removing the holding-piece E and moving the sleeve along the post until it reaches a point where the pin can be again inserted in one of the holes of the seat-post. Obviously the projecting part of the holding-piece E may be slid from above into the groove $a'$ and when engaged with said groove will hold the sleeve and seat-post from rotation.

The construction illustrated in Figs. 4, 5, and 6 has the advantage over that shown in Figs. 1, 2, and 3 of affording a positive lock or holding device to prevent the twisting or turning of the seat-post under strains coming upon the saddle.

The device as a whole has the advantage of great simplicity and cheapness of construction combined with the requisite security in the holding of the seat-post in position.

I claim as my invention—

1. The combination with a tapered seat-post socket and a cylindric seat-post, of a tapered split sleeve surrounding the seat-post, said sleeve being adjustably secured to the seat-post by means acting to hold the sleeve from endwise movement on the seat-post when placed in a desired position thereon.

2. The combination with a tapered seat-post socket and a cylindric seat-post, of a tapered, split sleeve surrounding the seat-post and fitting within the socket, said post being provided with locking-holes, and the sleeve with a locking projection for adjustably securing the sleeve to the seat-post.

3. The combination with a tapered seat-post socket and a cylindric seat-post, of a tapered, split sleeve surrounding the seat-post and fitting within the socket, said post being provided with locking-holes, and the sleeve with a stud, movably secured to said sleeve, for adjustably securing the sleeve to the post.

4. The combination with a tapered seat-post socket, and a cylindric seat-post, of a tapered split sleeve surrounding the seat-post and fitting the socket, means for adjustably securing the sleeve to the seat-post, and interfitting parts on the sleeve and socket for holding the sleeve from turning in the socket.

5. The combination with a tapered seat-post socket and a cylindric seat-post, of a tapered split sleeve surrounding the post and fitting the socket and a holding-piece constructed to engage the said seat-post, sleeve and socket for locking the sleeve to the seat-post and for holding the sleeve and post from turning within the socket.

6. The combination with a tapered seat-post socket, and a cylindric seat-post provided with a plurality of locking-holes, of a tapered split sleeve surrounding the seat-post and fitting the socket, and a holding-piece provided with a holding projection to engage said holes, said sleeve and socket being provided with opposite recesses adapted to receive said holding-piece.

In testimony that I claim the foregoing as my invention I affix my signature, in presence of two witnesses, this 17th day of May, A. D. 1897.

WILLIAM H. FAUBER.

Witnesses:
TAYLOR A. BROWN,
R. CUTHBERT VIVIAN.